Aug. 26, 1958 S. GOTTFRIED 2,848,914
WIRE STRIPPING DEVICE
Filed March 7, 1955
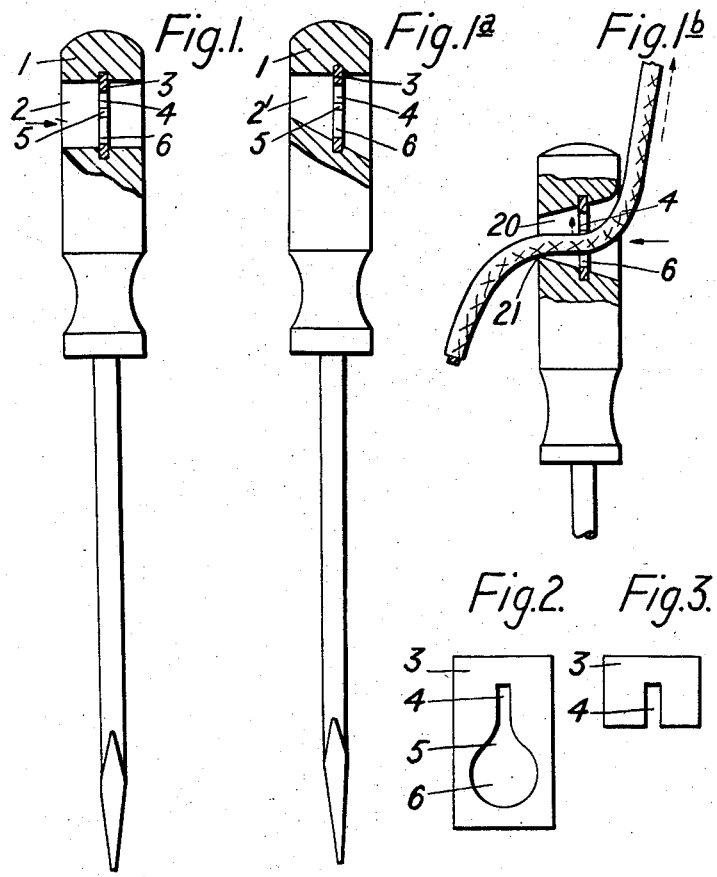

United States Patent Office 2,848,914
Patented Aug. 26, 1958

2,848,914

WIRE STRIPPING DEVICE

Shalom Gottfried, Haifa, Israel

Application March 7, 1955, Serial No. 492,477

Claims priority, application Israel March 14, 1954

1 Claim. (Cl. 81—9.5)

This invention relates to hand tools and has for its purpose to provide provisions therein enabling the workman to strip wires or cables he is working with from their coatings, or more particularly to provide stripping means within tools as they are carried in a workman's pocket or tool kit, said means preferably being located within the handle of such tools.

It is an object of the invention to provide a stripping device at the inner portion of an implement in a way so as to protect the stripping edges of said device from being damaged.

It is another object of the invention to provide a combination tool suitable as well for regular working use, for example for driving screws, as also in addition for wire stripping.

It is still another object of the invention to provide an implement capable of protecting workman's hands while at work from being hurt by the stripping edges.

These and other features of the invention are described with reference to the annexed drawing in which Figs. 1, 1a and 1b show an implement of the inventive design by way of illustration as a combination screw driver with different modifications of the handle, while Figs. 2 to 7 illustrate at enlarged scale, modified designs of slotted or perforated stripped plates.

Following now the drawing, Fig. 1, transverse passage 2 is provided in handle 1 of the hand tool and a flat stripper plate 3 is mounted within said handle in said passage, with the plane of said plate extending perpendicular to the axis of the said passage, said stripper plate having cutting edges forming a slot having a widened portion at one end and a narrowed portion at another end so that the widened portion will permit free passage of a wire therethrough whereas the narrowed portion will strip the wire from any coating thereon. A plate of the kind described is shown at a slightly enlarged scale by Fig. 2. There is a vertical slot 4 whose lower portion 5 emerges into a circular enlargement 6 of substantially wider diameter than is the width of the slot itself.

Figs. 3-7 show plates intended to be inserted in the handle across the portion of said passage, located oppositely to the blade of the tool so that a free way for wires is spared in said passage below said plates 3.

Slots of miscellaneous profile may be used for stripping the wires, so for instance a slot having parallel edges is illustrated by Fig. 3, while the slot shown by Fig. 4 is V-shaped. The slot demonstrated by Fig. 5 has two convergingly curved cutting edges while the open ends of slots in Fig. 6 or 7 are chamfered. A free passage is left below said slots, in the transverse hole beneath the respective plate (3) whatever their modifications may be.

Figs. 1a and 1b show similar patterns with the exception of the length profile of the passages. The one as by Fig. 1a ends into a smaller opening at one of its ends than is the opening at its other end, while Fig. 1b shows a funnel-shaped passage.

The latter profile proves to be most practical, as may be readily seen from Fig. 1b by which the stripping procedure itself is demonstrated. As per this figure, the cable is introduced into opening 20 in the direction of the arrow and is passed first across enlargement 6 (or in the case of a plate according to Figs. 3–7 through the passage way left below the lower edge of plate 3). The cable when leaving the handle at the opposite end of passage 6 is forcibly bent slightly upwards by a raised edge 21 of the passage. The cable is then forcibly retracted in upward direction, as indicated by the dotted arrow (Fig. 1b), whereby the cable is forced into slot 4, its stripping edges biting into the insulating coat of the cable thereby stripping it off, thus leaving the bare core. It is self-explanatory to select a slot of a width adequate to the diameter of the core.

In manufacture, the handle (or the equivalent part of another tool) may be moulded from plastic material and plate 3 inserted while moulding.

The expression "coated" whenever occurring is meant to define any kind of coating, insulation or coverage such as rubber, plastics, tar products or enamel, also combined insulations compiled from several layers or braids including textile materials, as used in electrical appliances or accessories.

While in the drawing and the foregoing description reference is had to an inventive screw driver by way of illustration or example, all kinds of tools and related appliances may be used to embody my invention without departure from its spirit.

What I claim and wish to protect by Letters Patent is:

A wire stripping device comprising a handle having a hole forming a transverse passage extending through said handle, a flat stripper plate mounted in said passage with the plane of the plate extending perpendicular to the axis of the passage, said stripper plate having cutting edges forming a slot merging into said hole, said slot having a widened portion at one end and a narrowed portion at another end so that the widened portion will permit free passage of a wire whereas the narrowed portion will strip the wire of any coating thereon.

References Cited in the file of this patent

UNITED STATES PATENTS

| | | |
|---|---|---|
| 572,452 | Schott | Dec. 1, 1896 |
| 1,260,642 | Chia | Mar. 26, 1918 |
| 2,273,048 | Kiefer | Feb. 17, 1942 |
| 2,306,403 | Mortensen | Dec. 29, 1942 |
| 2,361,402 | Jamieson | Oct. 31, 1944 |
| 2,627,768 | Cook | Feb. 10, 1953 |